May 17, 1932.  T. A. SCHAAD  1,859,006
FILE CUTTING LATHE
Filed July 30, 1928  3 Sheets-Sheet 1
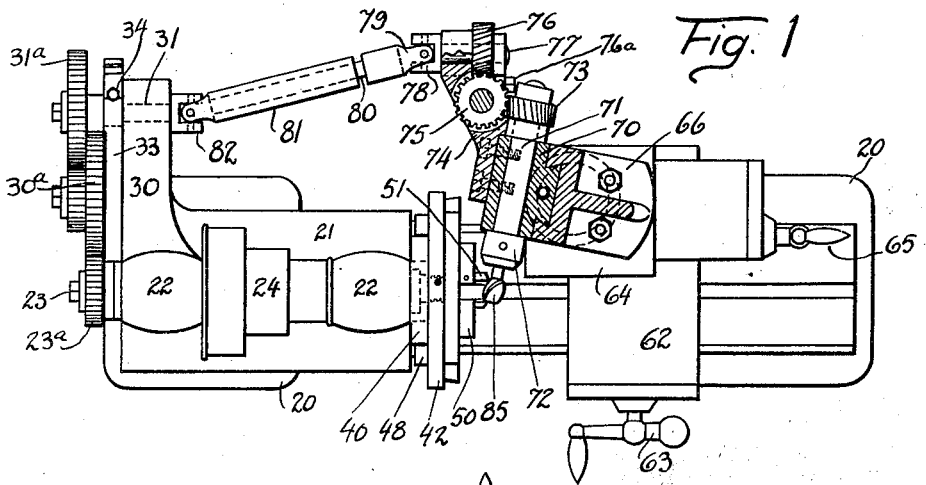
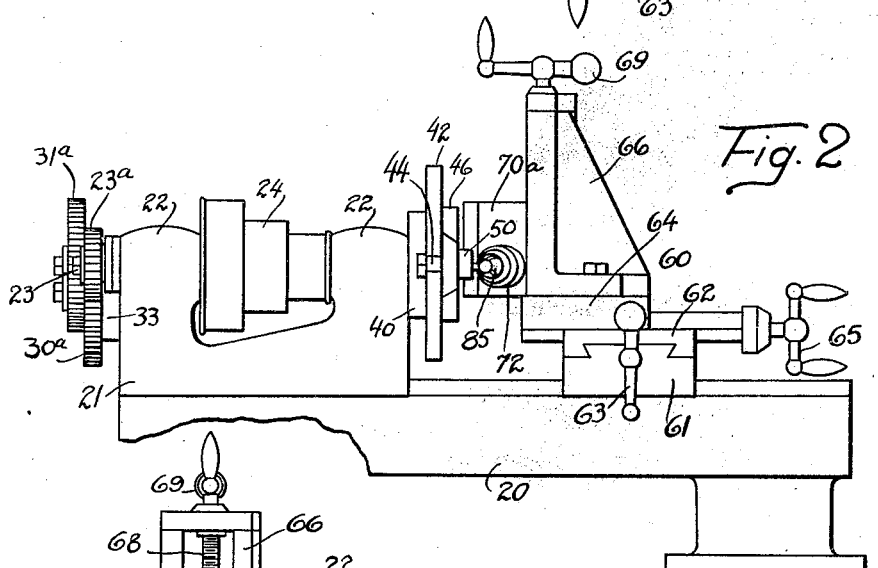
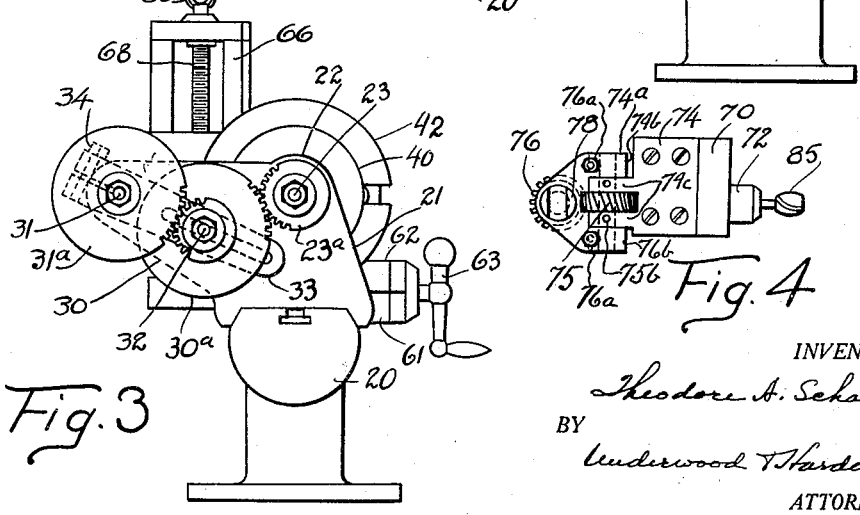
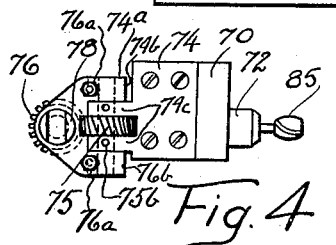
INVENTOR.
Theodore A. Schaad
BY
Underwood & Hardesty
ATTORNEYS May 17, 1932.   T. A. SCHAAD   1,859,006
FILE CUTTING LATHE
Filed July 30, 1928   3 Sheets-Sheet 2
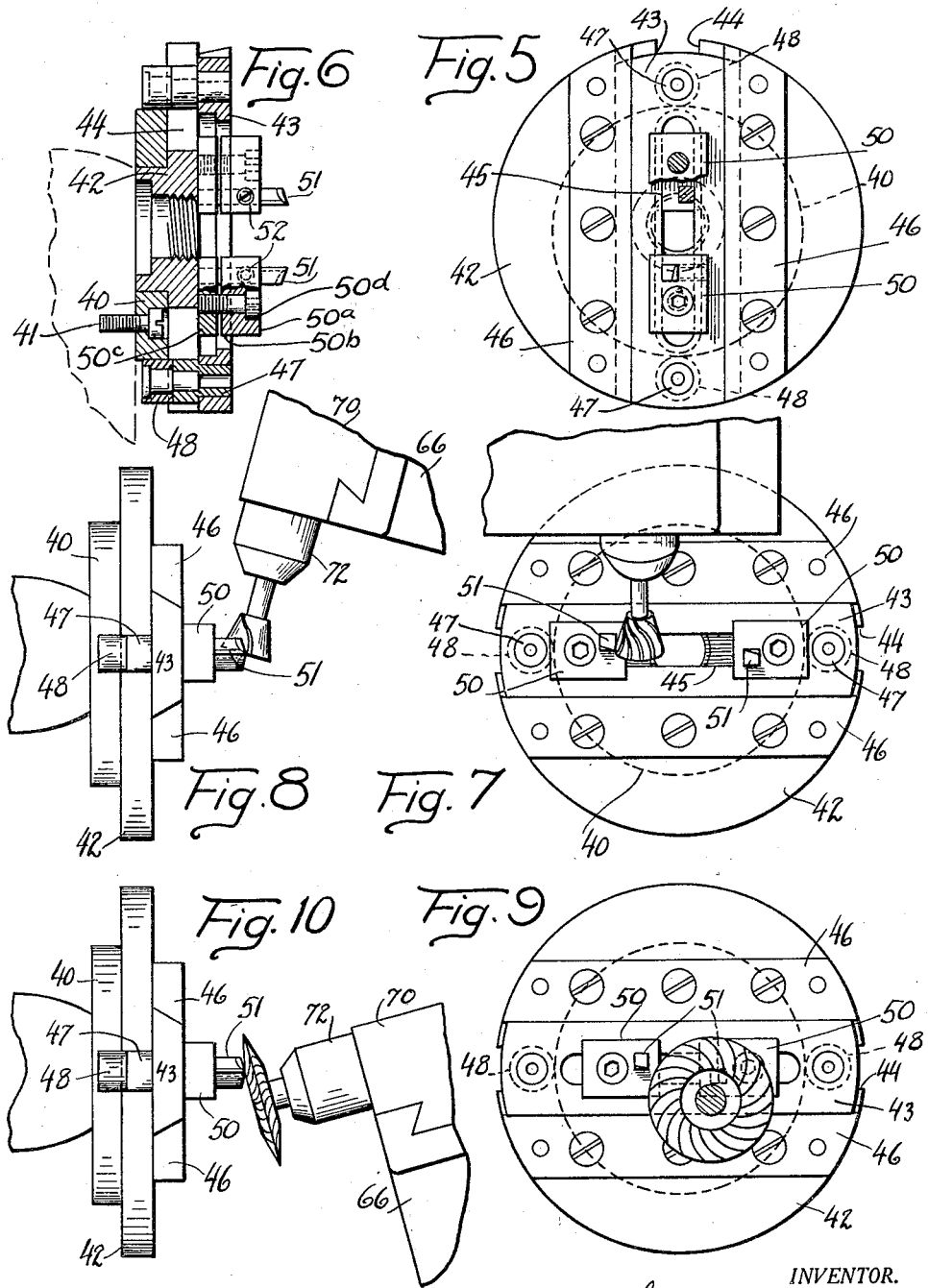
INVENTOR.
Theodore A. Schaad
BY
Underwood & Hardesty
ATTORNEYS

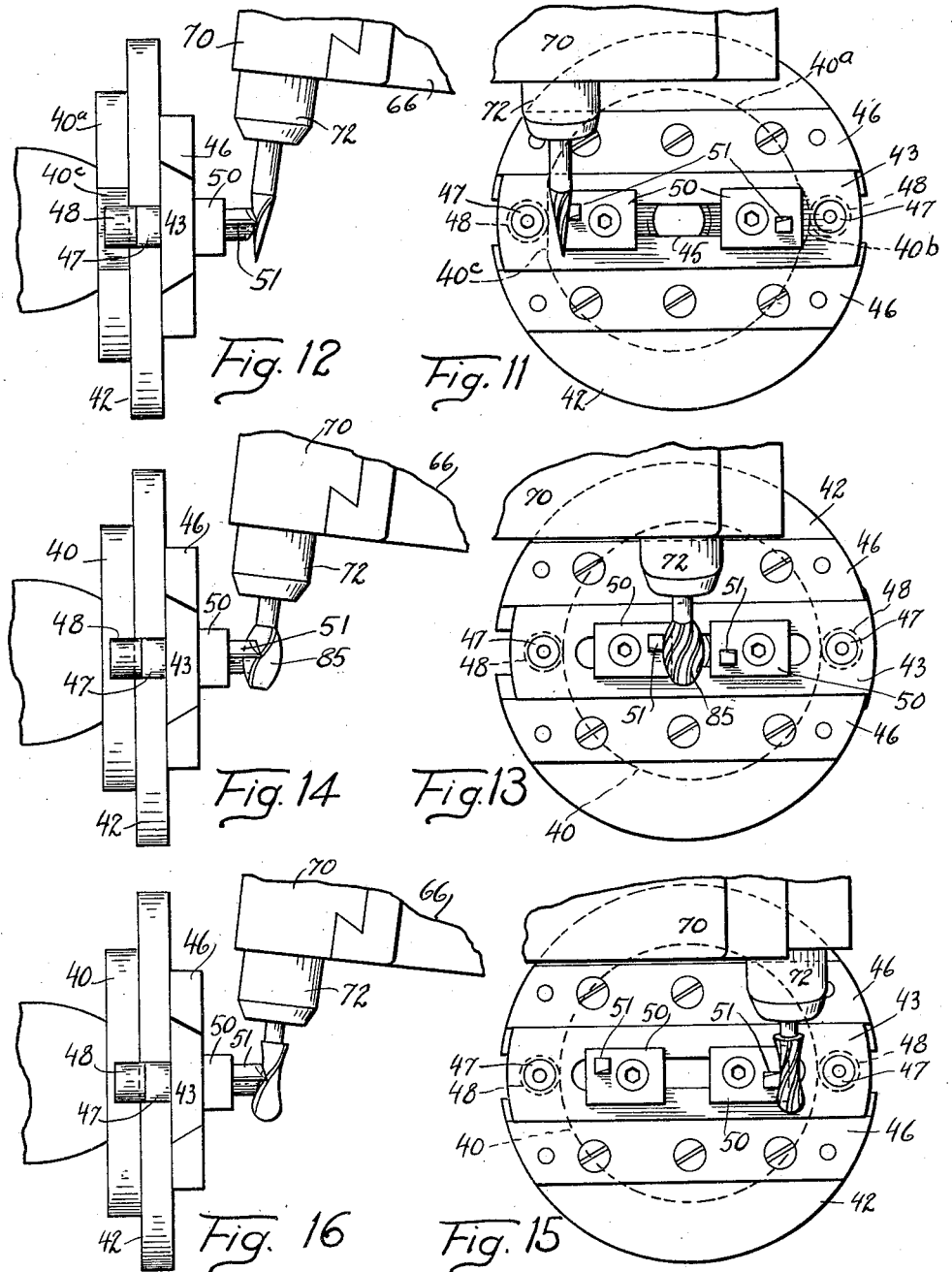

Patented May 17, 1932

1,859,006

UNITED STATES PATENT OFFICE

THEODORE A. SCHAAD, OF DETROIT, MICHIGAN

FILE CUTTING LATHE

Application filed July 30, 1928. Serial No. 296,108.

The present invention relates to lathes for cutting spiral grooves in blanks more especially for the production of rotary files though the invention is not limited to the production of such tools.

Among the objects of the invention is a machine for cutting such grooves and on which may be used blanks having concave, straight, or convex surfaces.

Another object is a machine of the type indicated which may be easily altered to regulate the pitch, depth, number and spacing of said grooves.

Still another object is a machine of the type indicated which shall be simple and efficient both in construction and operation.

Yet other objects will readily occur to those skilled in the art upon reference to the following description and the accompanying drawings in which Fig. 1 is a plan view of the machine.

Fig. 2 is a front elevation thereof.

Fig. 3 is an end elevation showing the drive gearing.

Fig. 4 is an end elevation of the slide carrying the work holding spindle.

Figs. 5 and 6 are respectively an end elevation and vertical longitudinal section through the cutter carrier and operating means.

Figs. 7 and 8 are respectively end and side elevations showing the arrangement for cutting a frustro conical blank.

Figs. 9 and 10 are similar views showing a double beveled edge disc blank.

Figs. 11 and 12 are similar views showing a tapered pointed blank.

Figs. 13 and 14 are similar views showing an elongated oval blank, and

Figs. 15 and 16 are similar views showing a blank having a concave surface.

Referring to Figures 1 to 4 inclusive, the machine is shown as comprising a base 20 provided at one end with a head stock 21 having at each end a bearing standard 22 in which is mounted the cutter drive shaft 23 upon which, between standards 22, is keyed a cone pulley 24. The head stock is shown as mounted for longitudinal movement on the bed 20 but may be fixed thereto or integral therewith if desired.

Upon one side of the head stock is an extension 30 in which is mounted a second shaft 31, each of the shafts 23 and 31 carrying a gear, 23a and 31a respectively, an intermediate gear 30a serving to transmit the driving force from the first to the second.

The gear 30a is a stepped gear for reducing the speed of shaft 31 to the desired rate and is carried on a stub shaft 32 mounted in a slotted member 33 clamped around the bearing boss concentric with shaft 31, the member being fixed in its proper angular position by tightening bolt 34. Such an arrangement provides for changing the gears 23a, 30a, and 31a to obtain any desired relative speed of shafts 23 and 31.

At the end of the head stock 21 opposite to the gearing and on the end of shaft 23 is mounted the cutter mechanism shown in section in Fig. 6. This consists of a cam member 40 fixed to the headstock as by screws 41 and a rotatable plate 42 carried by shaft 23, which plate is provided with a wide diametrical groove for a movable cutter carrier 43 and has the radial slots 44 at the ends of the groove. The cutter carrier 43 consists of a plate, slotted at 45, held in the groove by means of plates 46 in such fashion as to allow it to move endwise, and is provided with studs 47 extending through the slots 44 in plate 42 to the rear side thereof, which studs carry rollers 48 adapted to coact with cam 40 to control the movement of the cutter carrier 43 as the plate 42 rotates.

The carrier 43 has mounted in the slot 45 two tool holders 50, preferably consisting of the block 50a in which the tool or cutter 51 may be fixed by means of a set screw 52, and which is provided with a tongue 50b fitting in the slot 45, and a second block 50c fitting in an undercut portion of the slot and secured to block 50a by means of a screw 50d.

The bed 20 is also provided with a tailstock indicated as a whole by the numeral 60. This will be provided with a longitudinally adjustable slide 61, the lateral adjustable slide 62 operable by the crank handle 63 and the second longitudinally adjustable slide 64 operable through handle 65. These slides and their adjustment will be conventional forms of such devices.

Mounted on the slide 64 is a support 66 rotatable about a vertical axis and capable of being fixed in angular position, carrying slidably mounted therein the block 70a vertically adjustable by the threaded shaft 68 operable through handle 69. This block carries a bearing 70 for a horizontal shaft 71, which shaft carries at one end a suitable chuck or work holder 72 and at its other end a spiral gear 73; also mounted on the block 70a is a bracket 74 carrying a second spiral gear 75 mounted to rotate about a vertical axis. The bracket 74 is provided with a portion 74a hinged thereto, the axis of the hinge being coincident with the axis of gear 75. This hinged portion carries a third spiral gear 76 mounted upon a short horizontal shaft 77 having at the end toward the head stock one element 78 of a universal joint.

The hinge joint and mounting for the portion 74a and gear 75 is preferably made by fixing a shaft 75a in the ears 74c of bracket 74 as by pins 75b with the gear 75 loose. The hinged portion 74a may be thus fixed in angular position on the shaft 75a by means of screws 76a, the collar portions 76b being split for the purpose.

The other element of the universal joint 79 is fixed to the end of one member 80 of a telescopic shaft connecting the shaft 77 with the shaft 31 through the second element 81 of the telescoping shaft and a second universal joint 82.

By means of the construction of the tail stock and associated parts, the work piece 85 secured in the chuck or work holder 72 may be moved to substantially any angular position with respect to the plane of movement of the cutters 51 and the axis of shaft 23. It will be seen, therefore, that by varying the position of the cutters in the cutter carrier and the position of the work piece 85 with respect thereto and by using a suitable combination of drive gears 23a, 30a and 31a, almost any relative speed of rotation of the work and movement of the cutters may be obtained.

Further by changing the contour of the cam 40, it is possible to obtain substantially any kind of a cut in the work piece.

Referring particularly to Figures 13 and 14, it will be noted that the cam 40 is approximately circular, but not exactly so, as the contour must be such as to produce the desired cut. This cam is located in a position somewhat eccentric to the axis of the cutter driving shaft and because of this fact, only one of the cutters 51 is in contact with the work piece 85 at any given time. As the plate 42 moves around its center, the rollers 48 acting on the cam 40 cause the cutter carrier 43 to move diametrically to bring one cutter against the work while the other one is moved away from it.

Figures 7 and 8 show a similar cam with suitable contour but arranged concentric with the plate 42 and show the cutter holder 50 moved out to their extreme position and show the use thereof when cutting a frustro-conical spirally grooved file.

Figures 9 and 10 show a similar arrangement with the tool holders moved closely together and the work holders moved to such a position that their axes are almost aligned with the axis of the shaft 23. By means of this arrangement, spiral grooves may be cut in a file which is almost lense shaped.

Figures 15 and 16 show the use of the machine for cutting grooves in a concave surface. In this arrangement of the parts, the cutters 51 will be reversed in position so as to cut with their outer edges rather than the inside edges.

Figures 11 and 12 show the use of the device in spirally grooving conical or other straight surfaces. In this form of the device, the cutters will be arranged as in Figures 15 and 16 but the cam 40a will be provided with such a contour as will cause the cutters to move along the line of a cord of the circle rather than on an arc of the circle. This is indicated by the raised portion 40b of one side of the cam face and the flattened section 40c on the other side of the cam.

Now having described the invention and the preferred form of embodiment, it is to be understood that the said invention is to be limited not to the specific details herein described and illustrated, but only by the scope of the claims which follow.

I claim:—

1. In a lathe, a head stock, a spindle rotatably mounted therein and provided with a cutter head, a pair of cutters radially movable in and carried by said head, means for driving said cutters, means for moving said cutters radially with respect to the axis of the spindle, a tail stock comprising a rotatable work holder, means for adjusting the angle of the work holder with respect to the paths of the movement of the cutters, and means for rotating the work holder, the latter means comprising power transmitting means constructed to permit the adjustment of the work holder without disengagement, the cutter moving means being adapted to determine the alternate action of said cutters on said work and their linear movement during the cutting action.

2. In a lathe, a head stock, a spindle rotatably mounted therein and provided with a cutter head, a pair of cutters radially movable in and carried by said head, means for driving said cutters, and means for moving said cutters radially with respect to the axis of the spindle, a work holder rotatable at a predetermined speed by and from said spindle and means for causing alternately the action of said cutters on the work piece in said holder.

3. In a lathe, a head stock, a spindle rotatably mounted therein and provided with a cutter head, a pair of cutters radially movable in and carried by said head, means for driving said cutters, and means for moving said cutters radially with respect to the axis of the spindle, a work holder rotatable at a predetermined speed by and from said spindle and means for causing alternately the action of said cutters on the work piece in said holder, the latter means being also adapted to determine the linear movement of said cutters.

4. In a lathe, a head stock, a spindle rotatably mounted therein and provided with a cutter head, a cutter radially movable in and carried by said head, a work holder, means for moving said work holder, means for driving said cutter, means for moving said cutter radially with respect to the axis of the spindle, and means operatively connecting the work holder moving means to the cutter driving and moving means whereby the movement of the work is responsive to movement of the cutter.

5. In a lathe, a head stock, a spindle rotatably mounted therein and provided with a cutter head, a cutter radially movable in and carried by said head, a work holder, means for moving said work holder, means for driving said cutters, means for moving said cutters radially with respect to the axis of the spindle, and means operatively connecting the work holder moving means to the cutter driving and moving means whereby the movement of the work is responsive to movement of the cutters, said cutters being spaced from each other so as to alternately engage the work.

6. In a lathe, a head stock, a spindle rotatably mounted therein and provided with a cutter head, a cutter radially movable in and carried by said head, a work holder, means for moving said work holder, means for driving said cutter, means for moving said cutter radially with respect to the axis of the spindle, and means operatively connecting the work holder moving means to the cutter driving and moving means whereby the movement of the work is responsive to movement of the cutter, said work holder being angularly adjustable with respect to said cutter.

7. In a lathe, a head stock, a spindle rotatably mounted therein and provided with a cutter head, cutters radially movable in the head, a work support, means for rotating said spindle and for radially moving said cutters, means for rotating said work, and means operatively connecting said spindle rotating means with said work rotating means whereby movement of said work is responsive to movement of said cutters.

8. In a lathe, a headstock, a spindle rotatably mounted therein and provided with a cutter head, cutters radially movable in the head, a work support, means for rotating said spindle and for radially moving said cutters, means for rotating said work, and means operatively connecting said spindle rotating means with said work rotating means whereby movement of said work is responsive to movement of said cutters, said cutters being spaced from each other so as to alternately engage said work.

9. In a lathe, a head stock, a spindle rotatably mounted therein and provided with a cutter head, cutters radially movable in the head, a work support, means for rotating said spindle and for radially moving said cutters, means for rotating said work, and means operatively connecting said spindle rotating means with said work rotating means whereby movement of said work is responsive to movement of said cutters, said work support being angularly adjustable with respect to the cutters.

10. In a lathe, a cutter and a work support, means for moving said work support longitudinally and laterally of the lathe bed, means for moving said work support towards and away from the bed, means for rotating said work in its own axis, means for moving said cutter, and means operatively connecting said work rotating means and said cutter moving means, whereby rotation of said work is responsive to movement of said cutter.

11. In a lathe, a cutter and a work support, means for moving said work support longitudinally and laterally of the lathe bed, means for moving said work support towards and away from the bed, and means for moving said work support around an axis transverse to the plane of said bed, means for rotating said work in its own axis, means for moving said cutter, and means operatively connecting said work rotating means and said cutter moving means whereby rotation of said work is responsive to movement of said cutter.

12. In a lathe, a cutter and a work support, means for adjustably positioning said work support with respect to the path of movement of said cutter, means for rotating said work, means for rotating and shiftingly moving said cutter, and means operatively connecting said work rotating means and said cutter moving means, whereby rotation of said work is responsive to movement of said cutter.

13. In a lathe, a cutter and a work support, means for adjustably positioning said work support with respect to the path of movement of said cutter, means for rotating said work, means for rotatably and radially moving said cutter, and means operatively connecting said work rotating means and said cutter moving means, whereby rotation of said work is responsive to movement of said cutter.

THEODORE A. SCHAAD.